(12) United States Patent
Scholl et al.

(10) Patent No.: US 6,696,523 B1
(45) Date of Patent: Feb. 24, 2004

(54) HYDROXYL GROUP-CONTAINING DIENE RUBBER

(75) Inventors: Thomas Scholl, deceased, late of Bergisch Gladbach (DE), by Ulrike Scholl, Philipp Scholl, Christine Scholl, Johannes Scholl, legal representatives; Jürgen Trimbach, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/980,615

(22) PCT Filed: Apr. 20, 2000

(86) PCT No.: PCT/EP00/03617

§ 371 (c)(1),
(2), (4) Date: Jan. 18, 2002

(87) PCT Pub. No.: WO00/68311

PCT Pub. Date: Nov. 16, 2000

(30) Foreign Application Priority Data

May 6, 1999 (DE) ............................................ 199 20 894

(51) Int. Cl.$^7$ .................. C08L 19/00; C08L 19/20; C08L 23/00
(52) U.S. Cl. .................. 525/191; 525/232; 525/241; 526/335; 526/336; 524/492; 524/495
(58) Field of Search .................. 526/335, 336; 525/191, 232, 241; 524/492, 495

(56) References Cited

U.S. PATENT DOCUMENTS

| 3,627,856 A | * 12/1971 | Thienot | 525/233 |
| 5,070,150 A | 12/1991 | Hopper | 525/350 |
| 5,227,425 A | 7/1993 | Rauline | 524/493 |
| 5,409,969 A | 4/1995 | Hamada | 525/213 |
| 5,496,883 A | 3/1996 | Hamada | 524/492 |
| 6,252,008 B1 | * 6/2001 | Scholl et al. | 525/333.5 |
| 6,319,994 B2 | * 11/2001 | Scholl et al. | 525/333.5 |

FOREIGN PATENT DOCUMENTS

| DE | 1 470 920 | 3/1969 |
| DE | 1 954 446 | 5/1970 |
| DE | 1 816 394 | 7/1970 |
| EP | 0 334 042 | 11/1993 |
| EP | 0 806 452 | 11/1997 |
| GB | 1575115 | 9/1980 |

OTHER PUBLICATIONS

**C.S. Marvel et al.: "Polybutadiene Modified by Addition of Thiols Containing Polar Groups", Industrial and Engineering Chemistry, band 45, No. 9, 1953, pp. 2090–2093 XP002144506.

* cited by examiner

*Primary Examiner*—Nathan M. Nutter
(74) *Attorney, Agent, or Firm*—Joseph C. Gil; Noland J. Cheung; Jennifer R. Seng

(57) ABSTRACT

The present invention relates to rubber mixtures containing diene rubber with a concentration of primary hydroxyl groups of 0.1 to 2 wt. % and a glass transition temperature of –120° to –50° C. and their mixtures with fillers, optionally further rubbers and rubber auxiliary substances and vulcanisates prepared therefrom. Rubber mixtures according to the invention are suitable for producing highly reinforced, abrasion-resistant moulded items, in particular for producing tires treads which have a particularly high resistance to wet skidding.

13 Claims, No Drawings

HYDROXYL GROUP-CONTAINING DIENE RUBBER

FIELD OF THE INVENTION

The present invention provides rubber mixtures which contain a diene rubber with a concentration of primary hydroxyl groups of 0.1 to 2 wt. % and a glass transition temperature of −120 to −50° C. and their mixtures with fillers, optionally other rubbers and rubber auxiliary substances and vulcanisates prepared therefrom. Rubber mixtures according to the invention are suitable for producing highly reinforced, abrasion-resistant moulded items, in particular for producing tires which have particularly high wet skidding resistance.

BACKGROUND OF THE INVENTION

Double bond-containing solution rubbers, such as solution polybutadiene and solution styrene/butadiene rubbers, have advantages over the corresponding emulsion rubbers when producing low rolling resistance tire treads. The advantages are based, inter alia, on the ability to control the vinyl content, cis content and glass transition temperature and molecular branching associated therewith. Particular advantages in relation to abrasion, wet skidding resistance and rolling resistance of the tires result therefrom in a practical application. Thus, U.S. Pat. No. 5,227,425 describes the production of tire treads from a solution SBR rubber and silica. To further improve the properties, numerous methods for modifying the end groups have been developed, as is described e.g. in EP-A 334 042, with dimethylaminopropyl-acrylamide or, as described in EP-A 447,066, with silyl ethers. However, due to the high molecular weight of the rubber, the proportion by weight of end groups is small and can therefore have only a small effect on the interaction between filler and rubber molecule. The present invention is intended to provide solution diene rubbers such as solution polybutadiene and polyisoprene with a much higher concentration of effective groups for interacting with fillers.

A process for preparing hydroxyl group-containing solution polybutadiene rubbers is also described in DE-OS 2,653,144. These rubbers, however, have a much higher concentration of hydroxyl groups, associated with much higher glass transition temperatures.

EP-A 464,478 describes a process for hydroxylating rubber, wherein, however, secondary hydroxyl groups are introduced which are far less effective than the primary hydroxyl groups in the present invention.

Hydroxyl group-containing emulsion and solution rubbers are also described in EP-805,452 A1, wherein the hydroxyl concentrations described here for solution rubbers lie within a much lower range (0.009 to 0.061%), depending on the process used, and the glass transition temperatures are substantially higher (>−40° C.), depending on the styrene content, for the emulsion rubbers described.

SUMMARY OF THE INVENTION

It has now been found that rubber mixtures and rubber vulcanisates with surprisingly improved dynamic damping characteristics in the temperature range relevant to wet skidding resistance and the temperature range relevant to rolling resistance and also improved abrasion behaviour can be prepared from hydroxyl group-containing solution diene rubbers with a concentration of 0.1 to 2 wt. % of bonded primary hydroxyl groups and a glass transition temperature of −120 to −50° C. Further surprising advantages were obtained when the rubber mixture was prepared not in conventional compounders but by mixing a solution of hydroxyl group-containing rubber and oxidic or siliceous fillers in organic solvents and the solvent was then removed using steam, since then the filler is fully precipitated with the rubber and does not remain in the waste water, as when using an unmodified rubber.

DETAILED DESCRIPTION OF THE INVENTION

The present invention therefore provides rubber mixtures containing one or more hydroxyl group-containing rubbers built up from diolefins, characterised in that the hydroxyl group-containing rubber(s) contain in the range from 0.1 to 2 wt. % of bonded primary hydroxyl groups and have a glass transition temperature between −120 and −50° C. and fillers. The invention also provides use of said rubber mixtures for preparing rubber vulcanisates, in particular silica-filled tire treads with especially high abrasion resistance, especially high wet skidding resistance and a low rolling resistance.

Suitable diolefins are in particular 1,3-butadiene, isoprene, 1,3-pentadiene, 2,3-dimethylbutadiene, 1-phenyl-1,3-butadiene and/or 1,3-hexadiene. 1,3-butadiene and isoprene are particularly preferably used.

Rubbers according to the invention for use in rubber mixtures according to the invention can be prepared preferably by polymerisation using coordination catalysts in the presence of a solvent or by anionic solution polymerisation. Coordination catalysts in this connection are understood to be Ziegler-Natta catalysts, coordination catalysts and monometallic catalyst systems. Coordination catalysts are preferably those based on Ni, Co, Ti or Nd. Catalysts for anionic solution polymerisation are based on alkali or alkaline earth metals such as e.g. n-butyllithium. In addition, known randomised control agents for the microstructure of the polymer may be used. These types of solution polymerisations are known and are described e.g. in I. Franta Elastomers and Rubber Compounding Materials; Elsevier 1989, pages 113–131 and in Houben-Weyl, Methoden der Organischen Chemie, Thieme Verlag, Stuttgart, 1961, vol. XIV/1 pages 645 to 673 or in vol. E20 (1987), pages 114 to 134 and pages 134 to 153. The primary hydroxyl groups are introduced in a subsequent reaction of the final polymer. Methods for introducing primary hydroxyl groups are e.g. the addition of primary hydroxyl group-containing mercaptans, an addition reaction with formaldehyde, reaction with carbon monoxide followed by hydrogenation, hydroboration followed by oxidative hydrolysis of the borane compound.

The hydroxyl groups are preferably introduced by the addition of hydroxylmercaptans of the general formula (1) and/or hydroxyl group-containing mercaptocarboxylic esters of the general formula (2).

$$HS-R^1-OH \quad (1)$$

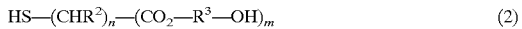

$$HS-(CHR^2)_n-(CO_2-R^3-OH)_m \quad (2)$$

in which
 $R^1$ represents a linear, branched or cyclic $C_1$–$C_{36}$ alkylene group, which may optionally be substituted with up to 6 further hydroxyl groups, or which may be interrupted by nitrogen, oxygen or sulfur atoms,
 $R^2$ represents hydrogen or a $C_1$–$C_6$ alkyl group and $R^3$ represents a linear, branched or cyclic $C_2$–$C_{36}$ alkylene group, which may optionally be substituted with up to 6 further hydroxyl groups or may be interrupted by nitrogen, oxygen or sulfur atoms, OH represents a primary hydroxyl group, n is an integer from 1 to 5 m is an integer from 1 to 2.

$C_1$–$C_{36}$ alkylene groups are understood to be any linear, cyclic or branched alkylene groups with 1 to 36 carbon atoms which are known to a person skilled in the art, such as methylene, ethylene, n-propylene, i-propylene, n-butylene, i-butylene, t-butylene, n-pentylene, i-pentylene, neo-pentylene, n-hexylene, cyclohexylene, i-hexylene, heptylene, octylene, nonylene decylene, undecylene and dodecylene.

Preferred hydroxylmercaptans are mercaptoethanol, 1-mercapto-3-propanol, 1-mercapto-butanol, 3-mercapto-1, 2-propanediol (thioglycerol), α-mercapto-ω-hydroxy-oligoethylene oxides such as e.g. α-mercapto-ω-hydroxyoctaethylene glycol or the corresponding ethylene oxide/propylene oxide mixed polyether. Mercaptoethanol, thioglycerol and α-mercapto-ω-hydroxy-oligoethylene oxides are particularly preferred.

Preferred hydroxyl group-containing mercaptocarboxylic esters are esters of mercaptoacetic acid, mercaptopropionic acid and mercaptobutyric acid with ethylene glycol, propylene glycol, butylene glycol, diethylene glycol, triethylene glycol, tetraethylene glycol, octaethylene glycol, dipropylene glycol, tripropylene glycol, tetrapropylene glycol, glycerol, N-methyl-diethanolamine. The corresponding esters of mercaptoaectic acid and 3-mercaptopropionic acid are particularly preferred.

Suitable radical starters for the addition of hydroxylmercaptans to hydroxyl group-containing rubbers are e.g. azo-initiators such as azobisisobutyronitrile, azobiscyclohexanonitrile and peroxides such as dilauroyl peroxide, benzopinacolsilyl ether or photoinitiators in the presence of UV or visible light. Preferred radical starters are di-acyl peroxides, in particular dilauroyl peroxide, didocecanoyl peroxide, di-(3,3,5-trimethylhexanoyl) peroxide, disuccinoyl peroxide, dibenzoyl peroxide and perketals such as 1,1-di-(tert.-butylperoxy)-3,3,5-trimethylcyclohexane, 1,1-di-(tert.-butylperoxy)-cyclohexane and 1,1-di-(tert.-butylperoxy)-butane.

Preferred amounts of radical starters are 0.5 to 20 wt. %, with respect to the hydroxyl-mercaptan.

The average molecular weight of the hydroxyl group-containing rubbers is between 50,000 and 2,000,000, preferably between 100,000 and 1,000,000.

The Mooney viscosity ML 1+4 of the copolymers is between 10 and 200, preferably 30 and 150, measured at 100° C.

The concentration of copolymerised 1,2-butadiene units ("vinyl content") is between 0 and 60 wt. %, preferably 1 to 50 wt. %.

The glass transition temperature is between −120 and −50° C., preferably −120 and −70° C. The glass transition temperature can be determined using known methods, e.g. by means of DSC (differential scanning calorimetry, rate of heating 20 K/min).

The cis-1,4 content of copolymerised dienes is between 10 and 100%, preferably between 30 and 99%, in particular 90–99%.

The concentration of primary hydroxyl groups is between 0.1 and 2 wt. %, preferably in the range 0.1 to 1 wt. %, in particular in the range 0.1 to 0.75 wt. %, with respect to the rubber.

The concentration of hydroxyl groups can be determined using known methods, that is, for example, by spectroscopy, titrimetry, elemental analysis or by determining the so-called hydroxyl value (OH value), that is by reaction with reagents which release titratable acids on contact with OH groups. See DIN 53 240 for details.

Rubbers according to the invention with a glass transition temperature of −120 to −50° C. and 0.1 to 2 wt. % of hydroxyl groups may be used individually, blended with aromatic or aliphatic oils or mixed with other rubbers. Additional rubbers which are suitable for the production of rubber vulcanisates are, in addition to natural rubber, synthetic rubbers. Preferred synthetic rubbers are described, for example, in W. Hoffmann, Kautschuktechnologie, Gentner Verlag, Stuttgart 1980 and I. Franta, Elastomers and Rubber Compounding Materials, Elsevier, Amsterdam, 1989. They include, inter alia, BR—polybutadiene ABR—butadiene/$C_1$–$C_4$-alkyl acrylate copolymers CR—polychloroprene IR—polyisoprene SBR—styrene/butadiene copolymers with styrene contents of 1 to 60, preferably 20 to 50 wt. %

IIR—isobutylene/isoprene copolymers

NBR—butadiene/acrylonitrile copolymers with acrylonitrile contents of 5 to 60, preferably 10 to 40 wt. %

HNBR—partially hydrogenated or fully hydrogenated NBR rubber

EPDM—ethylene/propylene/diene copolymers and mixtures of these rubbers. For producing vehicle tires, natural rubber, emulsion SBR and solution SBR rubbers with a glass transition temperature above −50° C., polybutadiene rubber with a high 1,4-cis content (>90%), which has been prepared using catalysts based on Ni, Co, Ti or Nd, and polybutadiene rubber with a vinyl content of 0 to 75% and their mixtures are of particular interest.

Quite specifically preferred rubber mixtures according to the invention contain, in addition to the hydroxyl group-containing rubber with a glass transition temperature between −120° and −50° C. additional rubbers from the group comprising natural rubber, polyisoprene and styrene/butadiene copolymers with styrene contents between 10 and 50 wt. %. The amount of these additional rubbers is normally in the range 0.5 to 95, preferably 40 to 90 wt. %, with respect to the entire amount of rubber in the rubber mixture. The amount of additionally added rubbers is again governed by the particular ultimate use of the rubber mixtures according to the invention.

Rubber mixtures according to the invention contain 5 to 300 parts by wt. of an active or inactive filler such as, for example;

highly disperse silicas prepared e.g. by precipitation from solutions of silicates or by flame hydrolysis of silicon halides with specific surface areas of 5 to 1000, preferably 20 to 400, $m^2/g$ (BET surface area) and with primary particle sizes of 10 to 400 nm. The silicas may also optionally be present as mixed oxides with other metal oxides such as Al, Mg Ca, Ba, Zn, Zr or Ti oxides, synthetic silicates such as aluminium silicate or alkaline earth metal silicates such as magnesium silicate or calcium silicate, with BET surface areas of 20 to 400 $m^2/g$ and primary particle diameters of 10 to 400 nm, natural silicates such as kaolin and other naturally occurring silicas, glass fibre and glass fibre products (mats, ropes) or glass microbeads, metal oxides such as zinc oxide, calcium oxide, magnesium oxide, aluminium oxide, metal carbonates such as magnesium carbonate, calcium carbonate, zinc carbonate, metal hydroxides such as e.g. aluminium hydroxide, magnesium hydroxide, carbon blacks. The carbon blacks to be used here are prepared by the lamp black, furnace black or channel black processes and have BET surface areas 20 to 200 $m^2/g$, such as e.g. SAF, ISAF, HAF, FEF or CPF carbon blacks, rubber gels, in particular those based on polybutadiene, butadiene/styrene copolymers, butadiene/acrylonitrile copolymers and polychloroprene.

Highly disperse silicas and carbon blacks are preferably used as fillers.

The fillers mentioned may be used individually or as a mixture. In a particularly preferred embodiment, the rubber mixtures contain a mixture of pale-coloured fillers, such as highly disperse silicas, and carbon blacks, as filler, wherein the mixing ratio of pale-coloured fillers to carbon blacks is 0.05 to 20, preferably 0.1 to 10.

The fillers are preferably added to the solution of polymerised rubber as solids or as a slurry in water or in a solvent to dissolve the hydroxyl group-containing rubbers(s). The rubber solution may be prepared beforehand, but the solution arising from polymerisation is preferably used directly. The solvent is then removed thermally or, preferably with the assistance of steam. The conditions for the stripping process can readily be determined in preliminary trials.

Furthermore, the fillers are preferably added to solid hydroxyl group-containing rubber or a mixture of rubbers and incorporated therein in a known manner, e.g. with a compounder.

Furthermore, rubber mixtures according to the invention also contain optional cross-linking agents. Sulfur or peroxides may be used as cross-linking agents, wherein sulfur is particularly preferred. Rubber mixtures according to the invention may contain further rubber auxiliary substances such as reaction accelerators, antioxidants, thermal stabilisers, light stabilisers, anti-ozonants, processing aids, plasticisers, tackifiers, blowing agents, colorants, pigments, waxes, extenders, organic acids, delaying agents, metal oxides and activators such as triethanolamine, polyethylene glycol, hexanetriol, etc. which are known in the rubber industry.

In preferred rubber mixtures with highly active precipitated silicas, the use of additional filler activators is particularly advantageous. Preferred filler activators are sulfur-containing silyl ethers, in particular bis-(trialkyloxysilyl-alkyl)-polysulfides, as are described in DE 2,141,159 and DE-AS 2,255,577, the oligomers and/or polymers of sulfur-containing silyl ethers in DE-OS 4,435,311 and EP-A 670, 347, mercaptoalkyltrialkoxysilanes, in particular mercaptopropyltriethoxysilane and thiocyanatoalkly silyl ethers such as are described in DE-OS 19,544,469.

The rubber auxiliary substances are used in conventional amounts, governed, inter alia, by the ultimate use. Conventional amounts are e.g. amounts of 0.1 to 50 wt. %, with respect to rubber.

Rubber mixtures according to the invention are outstandingly suitable for producing moulded items of all types.

Non-restricting examples of these moulded items are O-rings, sections, seals, membranes, tires, tire treads, damping elements and hoses.

Tires and tire treads are particularly preferred.

EXAMPLES

Example 1

12.5 g of 1-mercapto-2-ethanol and 1 g of dilauroyl peroxide were added to a solution of 500 g of solution polybutadiene rubber, Buna CB 65 (Bayer AG, Li type, cis-1,4 content about 40%) in 4 l of cyclohexane at 70° C. The mixture was then stirred for 8 hours at 80° C. At this point about 39% of the mercaptoethanol had reacted. Then 2.5 g of antioxidant Vulkanox 4020 (Bayer AG) were added and the solvent was distilled off using steam (100–110° C.). After drying at 70° C. under vacuum, 508 g of a colourless rubber with an OH-value of 7, an OH content of 0.21 wt. % and a cis-1,4 content of 40% were obtained. The glass transition temperature was –90° C.

Example 2

The same method was used as described in example 1, but only 6.25 g of 1-mercapto-2-ethanol were used. After 8 hours at 80° C., 41% conversion was achieved. Then the solvent was distilled off using steam (100–110° C.). After drying at 70° C. under vacuum, 505 g of a colourless rubber with a OH content of 0.1 wt. % and a cis-1,4 content of 40% were obtained. The glass transition temperature was –90° C.

Example 3

12.5 g of 1-mercapto-2-ethanol and 1 g of dilauroyl peroxide were added to a solution of 500 g of solution polybutadiene rubber Buna VI 47-0 (Bayer AG, vinyl-BR, concentration of 1,2-bonded butadiene (vinyl content) about 47%) in 4 l of cyclohexane at 70° C. The mixture was then stirred for 4 hours at 80° C. At this point, 95% of the mercaptoethanol had reacted. Then 2.5 g of antioxidant Vulkanox 4020 (Bayer AG) were then added and the solvent was distilled off using steam (100–110° C.). After drying under vacuum at 70° C., 512 g of a colourless rubber with an OH value of 17, an OH content of 0.5 wt. %, a vinyl content of about 45% and a glass temperature of –54° C. were obtained.

What is claimed is:

1. Rubbers comprising one or more hydroxyl-groups which are produced from diolefins, wherein said rubber(s) contain in the range 0.1 to 2 wt. % of bonded primary hydroxyl groups and have a glass transition temperature between –120 and –70° C., wherein said rubber(s) has cis-1,4 content, which is polymerized in solution, that is greater than 30%, and wherein said rubber(s) have an average molecular weight between 50,000 and 2,000,000.

2. Rubbers according to claim 1, wherein 1,3-butadiene and/or isoprene are used as diolefins.

3. Rubber mixtures comprising rubbers comprising one or more hydroxyl-groups which are produced from diolefins, wherein said rubber(s) contain in the range 0.1 to 2 wt. % of bonded primary hydroxyl groups and have a glass transition temperature between –120 and –70° C., and additional rubbers selected from the group consisting of natural rubber, polyisoprene and styrene/butadiene copolymers with styrene contents between 10 and 50 wt. %, in an amount of 0.5 to 95 wt. % with respect to the entire amount of rubber in the rubber mixture.

4. Rubber mixtures according to claim 3, wherein said additional rubbers are present in an amount of 40 to 90 wt. % with respect to the entire amount of rubber in the rubber mixture.

5. A process for preparing rubber mixtures containing in addition to rubbers, which comprise one or more hydroxyl-groups which are produced from diolefins, wherein said rubber(s) contain in the range 0.1 to 2 wt. % of bonded primary hydroxyl groups and have a glass transition temperature between –120 and –70° C., additional rubbers selected from the group consisting of natural rubber, polyisoprene and styrene/butadiene copolymers with styrene contents between 10 and 50 wt. %, in an amount of 0.5 to 95 wt. % with respect to the entire amount of rubber in the rubber mixture, comprising the step of adding one or more fillers to the solution of rubber(s) in amounts in the range 0.5 to 500 parts by wt. with respect to 100 parts by wt. of rubber, and optionally, further auxiliary substances for processing and/or further working-up and/or stabilization are added and then removing the solvent.

6. A process according to claim 5, wherein the solvent is removed with the assistance of steam.

7. Molded items comprising rubber mixtures, which contain rubbers comprising one or more hydroxyl-groups which are produced from diolefins, wherein said rubber(s) contain in the range 0.1 to 2 wt. % of bonded primary hydroxyl groups and have a glass transition temperature between −120 and −70° C., additional rubbers selected from the group consisting of natural rubber, polyisoprene and styrene/butadiene copolymers with styrene contents between 10 and 50 wt. %, in an amount of 0.5 to 95 wt. % with respect to the entire amount of rubber in the rubber mixture.

8. A molded item according to claim 7, wherein said molded item is a tire tread or tire sidewall.

9. Rubber mixtures comprising rubbers comprising one or more hydroxyl-groups which are produced from diolefins, wherein said rubber(s) contain in the range 0.1 to 2 wt. % of bonded primary hydroxyl groups and have a glass transition temperature between −120 and −70° C., and fillers present in an amount of 0.5 to 5 parts by weight with respect to 100 parts by weight of rubber selected from the group consisting of natural rubber, polyisoprene and styrene/butadiene copolymers with styrene contents between 10 and 50 wt. %, in an amount of 0.5 to 95 wt. % with respect to the entire amount of rubber in the rubber mixture.

10. Rubber mixtures according to claim 9, wherein said fillers are selected from the group consisting of siliceous and carbon blacks or mixtures thereof.

11. Rubber mixtures according to claim 9, wherein said filler is a mixture of highly dispersed siliceous and carbon black.

12. Rubber mixtures according to claim 11, wherein the mixing ratio of highly dispersed silicas to carbon black is 0.05 to 20.

13. Rubber mixture according to claim 12, wherein the mixing ratio is 0.1 to 10.

* * * * *